Figures 1, 2:
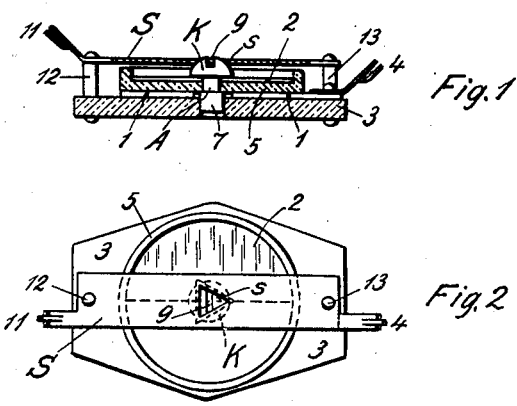

Jan. 28, 1941.     W. SCHEPPMANN     2,229,773
BALANCING CONDENSER
Filed July 9, 1938

Inventor:
Wilhelm Scheppmann
by C.C. Hopgood
Attorney

Patented Jan. 28, 1941

2,229,773

UNITED STATES PATENT OFFICE 2,229,773

BALANCING CONDENSER

Wilhelm Scheppmann, Berlin, Germany, assignor to C. Lorenz Aktiengesellschaft, Berlin-Tempelhof, Lorenzweg, Germany, a company Application July 9, 1938, Serial No. 218,445
In Germany October 14, 1935

1 Claim. (Cl. 175—41.5)

This application is a continuation in part of a copending application Serial No. 104,977, filed October 10, 1936, by Wilhelm Scheppmann, for Shaft arrangements and which has matured into Patent #2,180,853 dated Nov. 21, 1939.

The present invention relates to balancing condensers which consist of metal-plated insulating bodies adapted to be rotated relative to each other, and has for its object to improve the bearings of such rotatable insulating bodies.

Arrangements in connection with the bearing of the movable member of a condenser require an unrestricted relative motion between the two members without unadequate allowance and must be independent of extraneous influences, such as stresses set up on account of temperature changes, during the mounting operation, and even in cases of abrupt shocks. Moreover, the bearings themselves must be so designed that no utmost accuracy is necessary during the manufacturing process, specifically in cases of serial manufacturing which is generally required when the balancing condensers are concerned.

This problem is solved according to the invention by giving one end or the ends of the rotor shaft a spherical shape and to arrange this spherical or ball-shaped head in a triangular bearing provided on a bridge member or strap which holds the rotor of the condenser in its adequate position relative to the fixed portion of the condenser.

The invention will be more readily understood from the following description taken in conjunction with the accompanying drawing, in which Fig. 1 illustrates a cross sectional view through a condenser, the rotor of which is provided with a bearing according to the invention, while Fig. 2 is a top view of the arrangement shown in Fig. 1.

In the drawing, 5 denotes the movable portion or rotor of the condenser. This rotor has the shape of a flat cup of a ceramic substance, for example. This rotor is provided with a metallic condenser coating 2. The other metallic coating 1 of the condenser is placed on a plate preferably made of a ceramic material of low dielectric losses. The metallic coatings 1 and 2 which suitably are burnt onto the plate 3 and the rotor 5, respectively, are semi-circular in the present embodiment. The cooperating surfaces of rotor 5 and coating 1 are preferably ground onto each other. The shaft A which supports the rotor 5 has one cylindrical end and one ball-shaped end K which latter is provided with a slot 9 for adjusting the condenser by means of a screwdriver. The ball-shaped head is seated in a triangular aperture s provided in the bridge member or strap S mounted on the plate 3 by means of the bolts 12 and 13. The bridge or strap S is preferably arranged to bear yieldingly against the ball-shaped head so as to press the rotor 5 firmly against the metallic coating 1. The cooperation between the ball-shaped end of the shaft and the triangular aperture of the bridge member or strap S ensures an unrestrained bearing between these two members. The coating 1 and the bridge member 3 are each provided with a soldering tab 4 and 11, respectively.

What is claimed is:

An adjustable condenser comprising a stator plate, a rotor assembly including a rotor plate of ceramic material disposed against said stator plate and bearing means attached to said rotor plate and having a ball shaped head on the face remote from said stator plate, seating means having a triangular aperture resiliently pressed against said ball shaped head to make three-point contact therewith and to force said rotor plate against said stator plate, and condenser electrode surfaces on said rotor and stator plates respectively.

WILHELM SCHEPPMANN.